March 28, 1961   B. R. BREDBERG ET AL   2,976,609
INSTALLING TOOLS FOR TOGGLE-ACTION RETAINER ELEMENTS
Filed Sept. 30, 1955   3 Sheets-Sheet 1

INVENTOR.
BURRELL R. BREDBERG
WILLIAM L. GOLDEN
BY
Reynolds, Beach & Christensen
ATTORNEYS March 28, 1961 B. R. BREDBERG ET AL 2,976,609
INSTALLING TOOLS FOR TOGGLE-ACTION RETAINER ELEMENTS
Filed Sept. 30, 1955 3 Sheets-Sheet 2
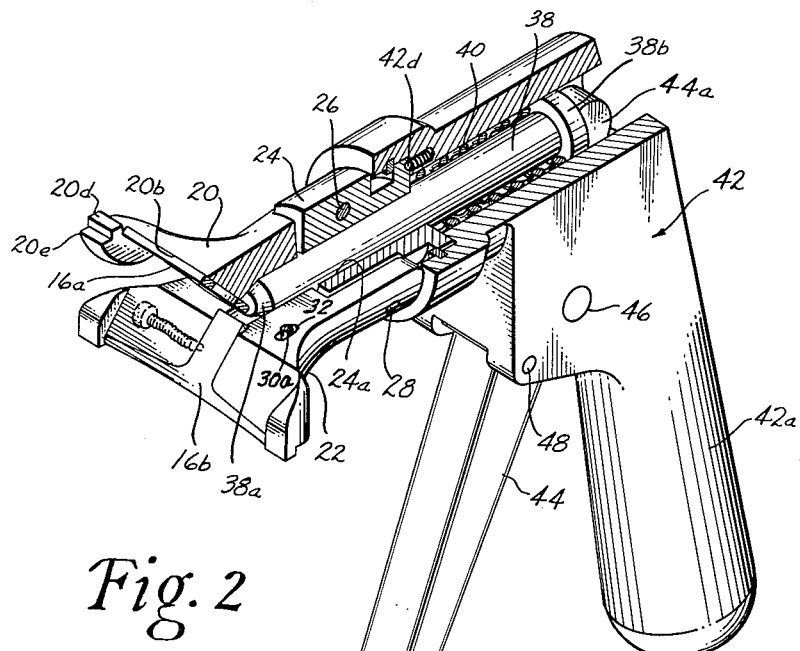
Fig. 2
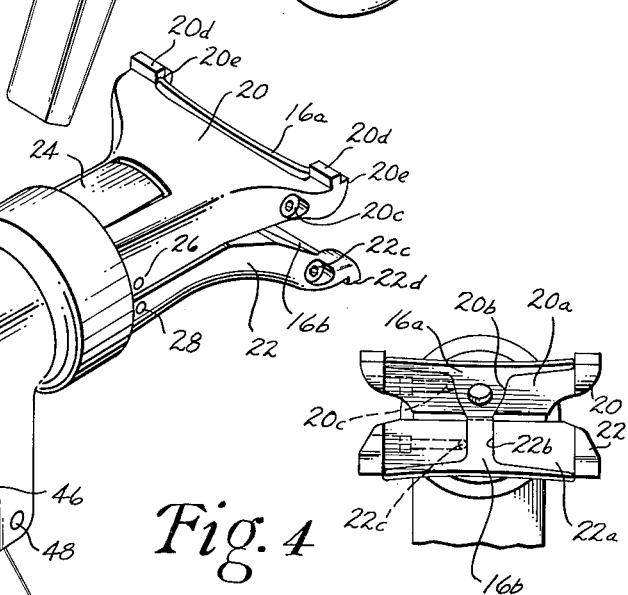
Fig. 3
Fig. 4
INVENTOR.
BURRELL R. BREDBERG
WILLIAM L. GOLDEN
BY
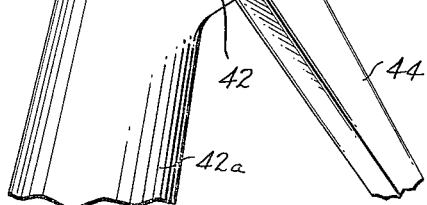
ATTORNEYS March 28, 1961   B. R. BREDBERG ET AL   2,976,609
INSTALLING TOOLS FOR TOGGLE-ACTION RETAINER ELEMENTS
Filed Sept. 30, 1955   3 Sheets-Sheet 3
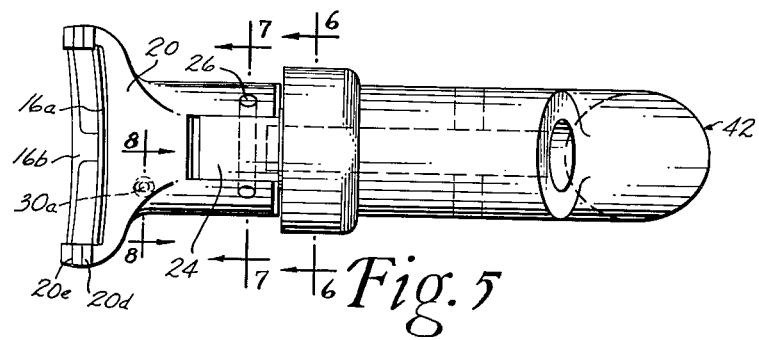
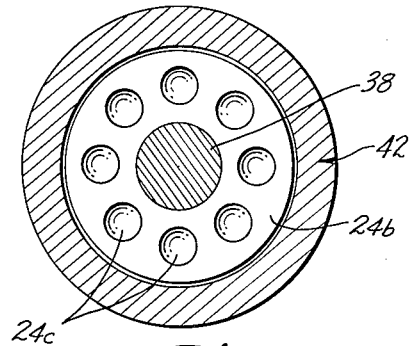
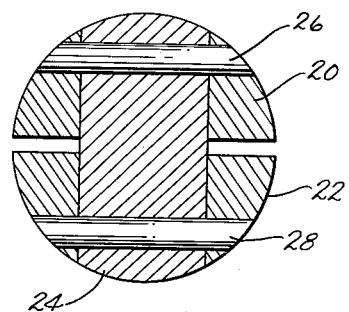
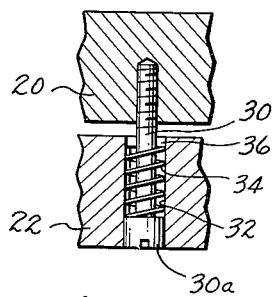
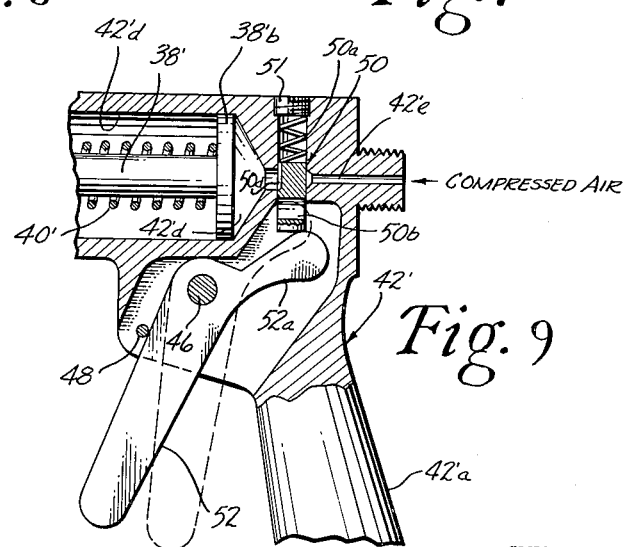
INVENTOR.
BURRELL R. BREDBERG
WILLIAM L. GOLDEN
BY
Reynolds, Beach & Christensen
ATTORNEYS United States Patent Office 2,976,609
Patented Mar. 28, 1961

2,976,609
INSTALLING TOOLS FOR TOGGLE-ACTION RETAINER ELEMENTS

Burrell R. Bredberg and William L. Golden, Seattle, Wash., assignors to Boeing Airplane Company, Seattle, Wash., a corporation of Delaware Filed Sept. 30, 1955, Ser. No. 537,752

7 Claims. (Cl. 29—270)

This invention relates to a novel tool for installing retainer elements of the toggle-action overcentering type, such as those employed in the fuel cell bead retaining device disclosed and claimed in the patent application of Wallace R. Swanson, Serial No. 433,060, filed May 28, 1954. The invention is herein illustratively described by reference to the presently preferred form thereof as intended for installation of the above-described retainer elements in such fuel cell installations; however, it will be recognized that in its broader aspects the invention is not confined to the details of illustration herein but may vary as to the specific form and arrangement of its parts.

In the illustrative application the fuel cell edge bead is pressed into sealing and retaining contact with the surface of a groove extending around a support structure such as the wing rib bulkhead structure of an airplane. Pressure against the resiliently deformable bead is applied, preferably through a presser bar, by a series of the removable toggle-action overcentering retainer elements reacting from a ledge formation on the support structure extending in spaced parallel relationship to the bead-retaining groove. The reaction ledge and also the presser bar are themselves grooved to receive the respectively opposite edges of the toggle action retainer elements. In the process of installing the retainer elements between bar and ledge the mutually adjacent hinging edges of the toggle action parts are swung outward from the common plane of the ledge and bar in order to insert the outer edges of such parts into the respective grooves thereof simultaneously. Thereupon the parts are swung into and past coplanar alignment into an overcentered position established by abutment of such parts with the support structure or by other suitable stop means establishing the desired relative angularity between the parts, hence the distended length of the retainer element as a whole at a value producing the desired deformation pressure against the fuel cell edge bead. Because of resilience of the bead and preferably also resilience of the retainer element parts the overcentered retainer element is locked in position, although it may be removed from the installation at will by forcibly swinging the retainer element parts outwardly past coplanar alignment.

An object of the present invention is a tool for quickly and conveniently installing toggle-action retainer elements such as those disclosed in the above-cited Swanson patent application. Because thousands of these retainer elements may be required in a single airplane the time savings realized by use of the tool are of considerable economic importance.

Another object of the invention is a retainer element installing tool cooperable with the reaction ledge or equivalent support structure for exerting the necessary installing pressure on the toggle action elements with a minimum of effort by the tool operator.

Another object of the invention is such a tool which is readily operated in any of different positions of the operating head thereof relative to the tool handle so as to permit using the tool for installing retainer elements at the bottom, along the sides, in the corners and at the top of the bulkhead structure supporting the fuel cell edge bead.

Another object of the invention is an installing tool of the described type having arm portions adapted to receive and hold the retainer element parts preliminarily in order to apply the same operatively to the support structure and presser bar. With such a tool, the retainer element parts may be either fastened together as described in said Swanson patent application or may be separate, although in either case assume a toggle-action relationship in the process of their installation.

These and other objects of the invention together with the novel features thereof and the details of construction of the preferred embodiment will become more fully evident from the following description by reference to the accompanying drawings.

Figure 2 is a perspective view of the tool as viewed from the operating end, with parts broken away to show interior construction, the tool carrying the retainer element parts.

Figure 3 is a perspective view of the tool viewed from the handle end thereof, the tool carrying the retainer elements parts.

Figure 4 is an end view of the tool as viewed from the operating end, the tool carrying the retainer element parts.

Figure 5 is a top view of the tool.

Figure 6 is a sectional view taken on line 6—6 in Figure 5.

Figure 7 is a sectional view taken on line 7—7 in Figure 5.

Figure 8 is a sectional detail taken on line 8—8 in Figure 5.

Figure 9 is a fragmentary side view of the handle and actuating portion of a modified tool, with parts broken away to show details.

Figure 1:
Figure 1 is a fragmentary sectional view in perspective showing the retainer element installation for which the installing tool is herein illustratively employed.

Referring to Figure 1, the airplane wing bulkhead structure 10 comprising the support structure for the edge-beaded fuel cell 12 has a bead-retaining groove 10a in which the fuel cell edge bead 12a is accommodated continuously around the peripheral edge of the cell. In the illustration, the bulkhead structure 10 has a similar fuel cell on each of the two opposite sides thereof. The bulkhead web 10b carries a reaction ledge 10c thereon in spaced parallel relationship to the bead-retaining groove 10a; the side of the reaction ledge 10c facing the groove 10a is itself grooved as shown. A presser bar or bearing strip 14, grooved on the side facing the reaction ledge 10c lays against the fuel cell edge bead 12a. By reaction from the ledge 10c the presser bar 14 is caused to bear firmly against the bead 12a and resiliently deform the latter to form a fluid-tight seal and a secure mechanical hold on the edge bead preventing its removal from the retaining groove 10a. The holding force required for that purpose is developed by toggle action overcentering retaining elements 16 located at intervals along the bead 12a. Each retainer element is formed in two parts, 16a and 16b, having complementarily formed adjacent edges at 16c permitting the parts to hinge together. For instance, one such edge may comprise a groove and the other a ridge retainable in the groove to permit hinging of one such part relative to the other about the edge as a pivot axis. Preferably the part 16a has an elongated arched, transverse foot 16a1 of resilient material adapted to fit into the longitudinal groove on the presser bar 14 while the retaining element part 16b has a similar foot 16b1 adapted to fit into the groove of the ledge 10c. Each arched foot is subject to material flattening upon installation of the retainer element and thereby applies resilient pressure to the presser bar 14. Overcentering of the parts 16a and 16b past coplanar relationship during the installation process causes the adjacent edge portions at 16c to bear laterally against the bulkhead 10b as a stop. The parts snap against the stop upon passing the overcentering point and are held in this locked position by the resilient recoil force of the foot portions 16a1 and 16b1 and by resilient recoil force of the resiliently deformable bead 12a reacting through the presser bar 14. An aperture 16a2 on one of the parts, such as the part 16a, is provided as a convenient means for removing the retainer element by means of a suitable tool, all as disclosed in the above-described Swanson patent application to which further reference may be made for additional details concerning the illustrative type of retainer element, and its mode of application in a fuel cell installation.

As shown in the drawings (Figures 2 through 8 and 10 and 11) the first illustrated form of the installing tool comprises the opposing spreader arms 20 and 22 pivotally mounted on a common support 24 to swing toward and from each other in a common plane about their respective parallel pivot pins 26 and 28 carried by such support. As shown in Figures 2 and 8, a machine screw 30 threaded transversely into one of the arms such as the arm 20 extends into and through an aligned bore 32 in the other arm and has a head 30a which serves as a stop for the helical compression spring 34 encircling the machine screw and reacting between such head and a stop 36 in the bore 32. The recoil force of this preloaded spring urges the arms 20 and 22 normally together.

The pivoted arms 20 and 22 have approximately equal projecting lengths and each has a broadened end portion provided with socket means for holding one of the two retainer element parts for application of the retainer element parts to the presser bar 14 and reaction ledge 10c of the fuel cell retaining structure. Thus the broadened end portion of the arm 20 has a transverse generally flat end face 20a which is inclined lengthwise outwardly from such arm away from the other arm 22, and this end face is provided wtih a recess 20b serving as a socket for holding the retainer element part 16a in substantially parallel relation to the end face 20a. The arm 22 likewise has a transverse end face 22a which is inclined oppositely to the end face 20a and which likewise has a recess 22b formed therein serving as a retaining socket for the retainer element part 16b. The recesses forming the respective holder sockets for the retainer element parts 16a and 16b in the ends of the arms are generally conformed to the outline shape of the retainer element parts which they respectively accommodate, and are so related positionally that with the arms drawn together by the spring 34 the hinging edges of mutual contact between the parts 16a and 16b are predisposed substantially in a common plane perpendicular to the arm axes so that the parts will interengage as they are ejected simultaneously from their retaining sockets by operation of the tool, as later explained. A spring-actuated ball detent 20c mounted in the end portion of the arm 20 presses against a side edge of the socketed part 16a to hold the part releasably in the socket 20b, whereas a similar ball detent 22c in the arm 22 likewise releasably holds the part 16b in its socket 22b.

Figure 10:
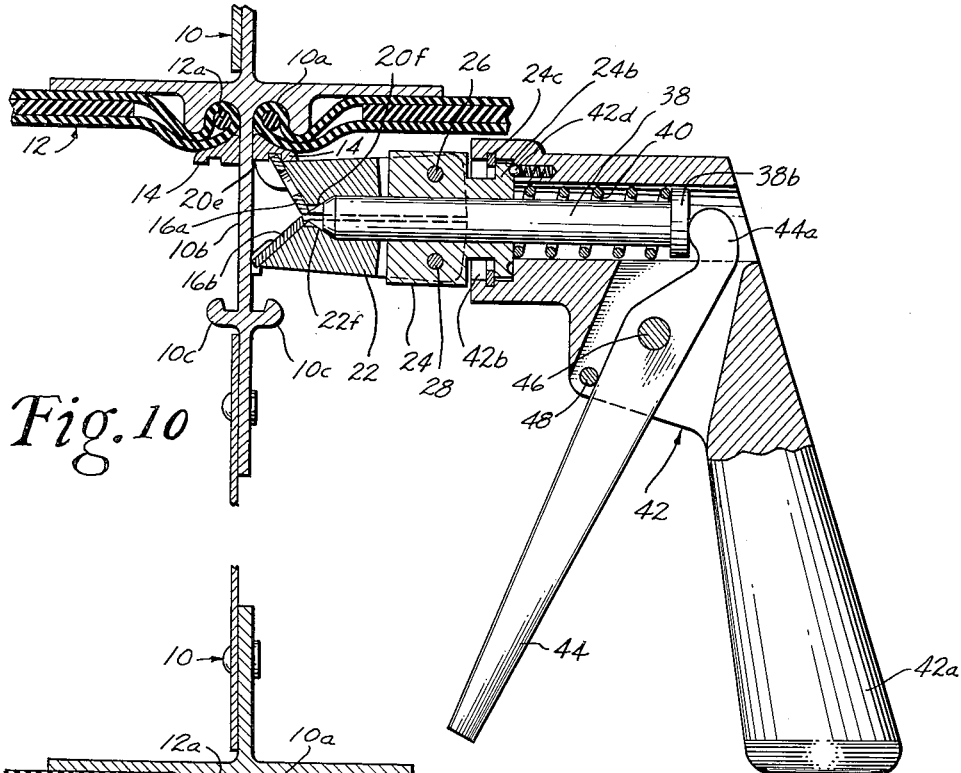
Figures 10 and 11 are operating views of the first illustrated tool applying retainer elements in a typical installation thereof.
Figure 11:
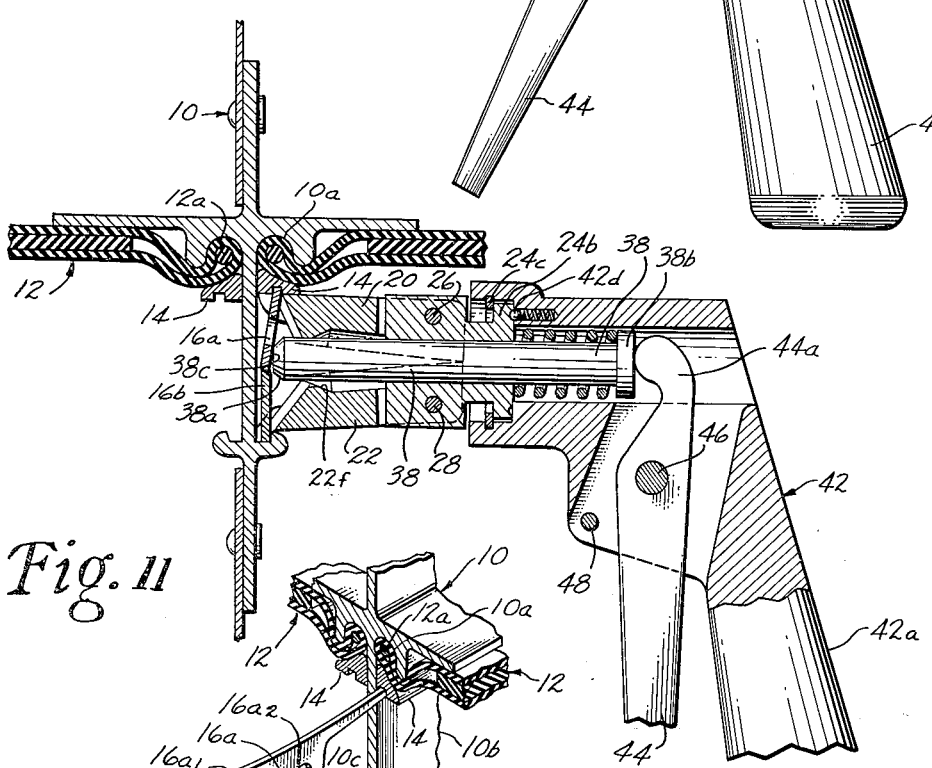

The broadened end portion of the arm 20 has a pair of lugs 20d on its end, projecting transversely from the side thereof away from the arm 22. These lugs are laterally aligned generally in the plane of the socketed retainer element part 16a and are situated on the arm 20 alongside the respective opposite ends of the foot portion 16a1 of the part 16a. The broadened end portion of the arm 22 has a pair of lugs 22d thereon generally similar in form and relative location on such arm to the lugs 20d on arm 20. The lugs 20d are formed to be lodged in the groove of the presser bar 14 while the lugs 22d are formed to be lodged in the groove of the reaction ledge 10c as shown best in Figure 11. The arm 20 has end projections 20e adjacent the lugs, which projections serve as locating elements adapted to abut the support structure web 10b in order to help place the lugs 20d in the presser bar groove (Figure 10). With the arms drawn together by the spring 34 the transverse distance separating the sets of lugs 20d and 22d exceeds the distance of separation between the presser bar 14 and reaction ledge 10c and it is then possible to lodge one set of lugs in the groove of one of the latter two members, whereupon by spreading apart the arms the other set of lugs may be inserted into the groove in the other such member (Figure 10).

In order to effect such relative spreading of the arms 20 and 22 the arm support 24 has a bore 24a extending longitudinally therethrough and a plunger 38 is slidably received in this bore. One end of the plunger projects into an axial cavity formed between the arms 20 and 22 and is chamfered at 38a. At the other end of support 24, a return spring 40 surrounds the plunger 38 and reacts between that side of the fitting 24 and a stop flange 38b on the corresponding end of the plunger. The tool has an L-shaped handle portion 42 of the pistol grip type which carries an actuating lever 44 pivoted on the transverse pin 46 and operable by the hand of the operator to advance the upper end of the lever, indicated at 44a, against the flanged end of the plunger 38 to advance the plunger into the space between the projecting ends of the arm. A stop pin 48 extending across the interior of the plunger cavity in the handle portion 42 establishes the retracted position of the plunger 38 by limiting the swing of the operating end of the lever 44 away from the handle proper 42a. The preloaded spring 40 normally holds the plunger in retracted position, withdrawn from the operating end of the arms 20 and 22, in which position the plunger does not prevent the arms from being drawn together.

As the plunger is advanced by drawing the operating end of the lever 44 toward the handle proper the chamfered end of the plunger initially contacts the opposing inside shoulders 20f and 22f of the arms 20 and 22 and by cam action wedges the sums apart sufficiently to lodge their respective sets of lugs, hence the foot portions of the retainer element parts 16a and 16b, in the respective grooves of the presser bar and reaction ledge (see Figure 10). Further advance of the plunger 38 causes the substantially flat end face thereof, 38c, to contact substantially simultaneously the abutting fulcrum edges of the retainer element parts and, by swinging the parts toward coplanar alignment, to press such parts first more firmly into the respective grooves of the presser bar and reaction ledge and then into overcentered, locking position of such parts (see Figure 11). Thus the plunger 38 serves as a spreading actuator for the arms 20 and 22 and also as an ejector and actuator for the toggle-action retainer element being installed by the tool. Thrust of the plunger in the latter phase of its travel is resisted by the sets of lugs anchoring the tool temporarily to the grooved bar 14 and ledge 10c.

Another feature of construction of the illustrated tool is the revolvable mounting of the member 24 serving as the supporting pivotal base for the arms. For this purpose the forwardly projecting portion of handle 42 has a round socket 42b therein which rotatably receives the flanged cylindrical end portion 24b of the base member 24 projecting oppositely from arms 20 and 22. A locking ring 24c retains the flanged portion 24b in the socket while permitting rotation thereof about the axis of the plunger 38. This permits rotatively orienting the pair of arms 20, 22 relative to the handle proper 42a for convenience in operating the tool around all portions of the fuel cell support structure. As shown in Figure 6, the flanged end portion 24b has a succession of detent recesses 24c therein selectively engageable by a ball detent 42d carried by the handle portion of the tool in order to hold the arm assembly in different selected rotative positions relative to the handle proper 42.

Referring to the modification shown in Figure 9, instead of actuating the plunger 38 manually by mechanical leverage as in the first described form, fluid pressure is used. In this case a piston 38'b is mounted on the end of the plunger 38' and slides longitudinally in a cylinder 42'd. Compressed air or other fluid is injected into and vented from the end of the cylinder 42'd through a passage 42'e under control of the trigger-actuated valve 50. A spring 50a retained by an apertured screw plug 51 in the slide bore of the valve element 50b holds the valve and also the trigger 52 in valve-closed position wherein the cylinder is vented through a passage 50d in the valve body 50. In this position of the valve plunger spring 40' holds the plunger in retracted position as in the previous form. However, by squeezing the trigger-lever 52 toward the tool handle proper 42'a, the lever's operating end portion 52a advances the valve in its bore against the force of valve spring 50a to the valve-open position and permits compressed air or other fluid to enter the end of the cylinder 42'd and advance the plunger 38' to operate the tool for installing a retainer element 16 as in the preceding form.

It will be noted that in both illustrated forms of the retainer element installing tool the sets of lugs 20d and 22d, or equivalent groove-engaging elements on the ends of the arms, are locating elements which guide the foot portions 16a1 and 16b1 of the tool-held retainer element into the respective bar and ledge grooves. Also these lugs hold the tool in operative position with respect to the fuel cell support structure during the application of installing thrust to the toggle action retainer elements which drives such elements past the position of alignment and into locked position. Thus in this application of thrust the operator is not required to exert himself particularly in order to hold the tool in operative position and it is therefore possible for the operator to work long hours without tiring and without loss of the necessary attention to detail and skillful use of the tool for good work. In the form of the tool shown in Figure 9 especially, operation of the tool is practically effortless.

In using the improved tool for installing retainer elements of the type herein referred to by way of illustration the complemental parts 16a and 16b of such retainer element are inserted in the respective sockets 20b and 22b in the inclined end faces of the arms 20 and 22 forming the operating head of the tool. The ball detents 20c and 22c hold these elements in place. The tool head (i.e. the parts 24, 20, 22, etc.) is rotatively adjusted relative to the handle 42 so that the handle projects away from the adjoining wall of the fuel cell along which the retainer elements are then being installed, as established by engagement of the ball detent 42d in one of the detent recesses 24c. One set of lugs such as the lugs 20d is then lodged in the groove of the adjacent reaction element such as the presser bar 14. The actuating lever 44 is then squeezed toward the handle proper 42a in order to advance the plunger 38 and, by cam action, wedge apart the arms 20 and 22 so as to advance the lugs 22d on the latter into the reaction ledge groove. When this is accomplished it will be noted that the foot portions 16a1 and 16b1 of the retainer element parts are positioned either inside the grooves or at the groove entrances in the parts in the presser bar 14 and reaction ledge 10c. Thus as the plunger 38 is advanced further along the shank of the tool its end face 38c is brought into substantially simultaneous contact with the fulcrum edges of the parts 16a and 16b to press such parts out of their retaining sockets in the tool and toward coplanar alignment. As the parts move past alignment towards the support structure web 10b, they snap into locked position against such web and are held there against reverse relative angular movement by virtue of the resilient recoil force of the foot portions 16a1 and 16b1 as well as that of the deformed resilient bead 12a. By releasing the lever 44, spring 40 automatically retracts the plunger 38, the spring 34 automatically draws the arms 20 and 22 together so that the sets of lugs on the ends of the arms are easily disengaged from the grooves, and the tool head is then readily withdrawn for reuse.

We claim as our invention:

1. An installing tool for a toggle-action retainer element of the type comprising two mutually hingeable parts adapted for applying thrust to opposing reaction members having parallel grooves therein respectively receiving the retainer element parts therein extending between such members, said tool comprising a pair of arm members, handle means for said tool, arm support means carried by said handle means and supporting said arm members in generally parallel relationship projecting from said support means and in a manner permitting relative movement of the projecting ends of said arm members toward and from each other, socket means on the projecting ends of the arm members adapted to hold the retainer element parts thereon with the hinging edges thereof disposed substantially together, said socket means, and thereby the respective parts held thereon, being angled to each other divergently in the direction away from the arm members lengthwise of the latter, groove-engaging lug elements projecting transversely from the ends of said arm members on the relatively outer sides thereof generally in coplanar alignment with and offset from the retainer element parts held therein, respectively, means operable to spread apart said arm members for advancing said lug elements and retainer parts into the reaction member grooves, plunger means supported between said arm members and guided to move lengthwise thereof to eject such retainer parts from the socket means and into oppositely angled relationship, and means operable to effect such movement of said plunger means.

2. The installing tool defined in claim 1, wherein the means to spread apart the arm members comprise shoulder portions on the arm members disposed for engagement by the plunger means during initiation of said ejection movement thereof.

3. A tool for installing in a support having generally parallel opposing grooves, a two-part toggle-action retainer element having two separate parts with mutually engageable hinging edges and with opposite or outer edges adapted to lodge in the respective grooves, said tool comprising handle means, an operating head projecting from said handle means, said operating head having a projecting end portion including separate socket means holding the respective retainer element parts releaseably therein with the hinging edges of such parts positioned adjacent each other and with such parts disposed in mutually divergent relationship endwise from the operating head, said separate socket means being mounted for relative movement together and apart, ejector means movably mounted in the tool and actuatable to contact said fulcruming edges of the parts substantially simultaneously and to press the parts by such edges out of the socket means and endwise from the operating head, lug means on said head disposed in relation to the retainer element parts to lodge in the same respective grooves therewith for locating the head operatively in relation thereto, and actuating means connected to said ejector means and operable at will for so actuating said ejector means, said ejector means comprising an elongated plunger element reciprocatively mounted in relation to the operating head, said separate socket means having mutually opposing shoulder surfaces, and said plunger element having shoulder surfaces engageable with those of said socket means during ejection movement of the plunger element, one of said shoulder surfaces being engageable with a shoulder surface of said socket means during ejection movement of said plunger element, and one of said shoulder surfaces being inclined in relation to the line of such movement in a sense causing relative spreading of said socket members by such engagement during such ejection movement.

4. A tool for installing in a support having generally parallel opposing grooves, a two-part toggle-action retainer element having two separate parts with mutually engageable hinging edges and with opposite or outer edges adapted to lodge in the respective grooves, said tool comprising handle means, an operating head projecting from said handle means and including two socket members mounted hingedly on said handle means for movement together and apart, in a direction transverse to the direction of projection of the operating head from the handle means, said socket members holding the respective retainer element parts releaseably thereon with the hinging edges of the retainer element parts positioned adjacent each other and with such parts disposed in mutually divergent relationship endwise from the operating head, and with said hinging edges of the retainer element parts being disposed parallel to the hinging axes of said socket members, lug means on the mutually outer edges of the socket members adapted to engage in the respective grooves of the support, an actuator mounted on said handle means and operable at will, and means moved by operation of said actuator, including a plunger element reciprocatively mounted in said head and normally retracted therein but guided for engaging the hinging edges of the retainer element parts for ejecting such parts from the socket members endwise of the operating head, thereby to press the retainer element parts into the opposing support grooves, said last mentioned means further including means operable simultaneously with ejection of said retainer element parts to spread apart said socket members in order to lodge the lugs thereof in the respective grooves for locating the operating head operatively in relation to said grooves.

5. The tool defined in claim 4, wherein the socket members have inclined camming surfaces and wherein the plunger includes means engageable with said camming surfaces during ejection movement of said plunger, thereby to spread apart said socket members by operation of the actuator.

6. The tool defined in claim 4, wherein the operating head is rotatively mounted on the handle means for turning into differnet positions about the axis of reciprocation of the plunger, and detent means for holding the operating head in any of different rotated positions on the handle means.

7. A tool for installing a two-part fulcruming toggle-action retainer between grooved supports, comprising a pair of arms, base means pivotally supporting said arms projecting in generally parallel relationship from said base means, retainer part holders carried by the ends of the resective arms, and disposed generally in relatively oppositely angled planes which intersect substantially between the arms in a line disposed transverse to the length of such arms, whereby with the arms swung substantially together the retainer parts lie at an angle to each other diverging endwise from the arms, with the mutually adjacent fulcruming edges of such parts located opposite each other, a locating lug on at least one of the holders at the outer edge thereof in substantial alignment with the holder plane and offset from the retainer part held therein, whereby both the outer edge of the parts and the lug may be simultaneously lodged in a support groove, plunger means guided in such base to move lengthwise of and between the arms, means operable to advance said plunger means from a retracted position withdrawn from said holders toward a projected position, contacting the fulcruming edges of the retainer parts and ejecting such parts out of the holders and into oppositely angled relationship, and means rigid with the arms and engaged by the plunger means during initiation of such advance movement of the latter, thereby to urge the arms relatively apart prior to ejection of the retainer parts.

References Cited in the file of this patent

UNITED STATES PATENTS

| | | |
|---|---|---|
| 1,404,109 | Fulton | Jan. 17, 1922 |
| 1,915,154 | De Schebeko | June 20, 1933 |
| 2,274,091 | Pavlecka et al. | Feb. 24, 1942 |
| 2,365,787 | Wallace | Dec. 26, 1944 |
| 2,433,640 | Wright | Dec. 30, 1947 |
| 2,700,910 | Van Niel | Feb. 1, 1955 |

FOREIGN PATENTS

| | | |
|---|---|---|
| 407,421 | Germany | Dec. 20, 1924 |